O. PETERSON.
BRAKE.
APPLICATION FILED JAN. 12, 1910.
1,021,474.
Patented Mar. 26, 1912.
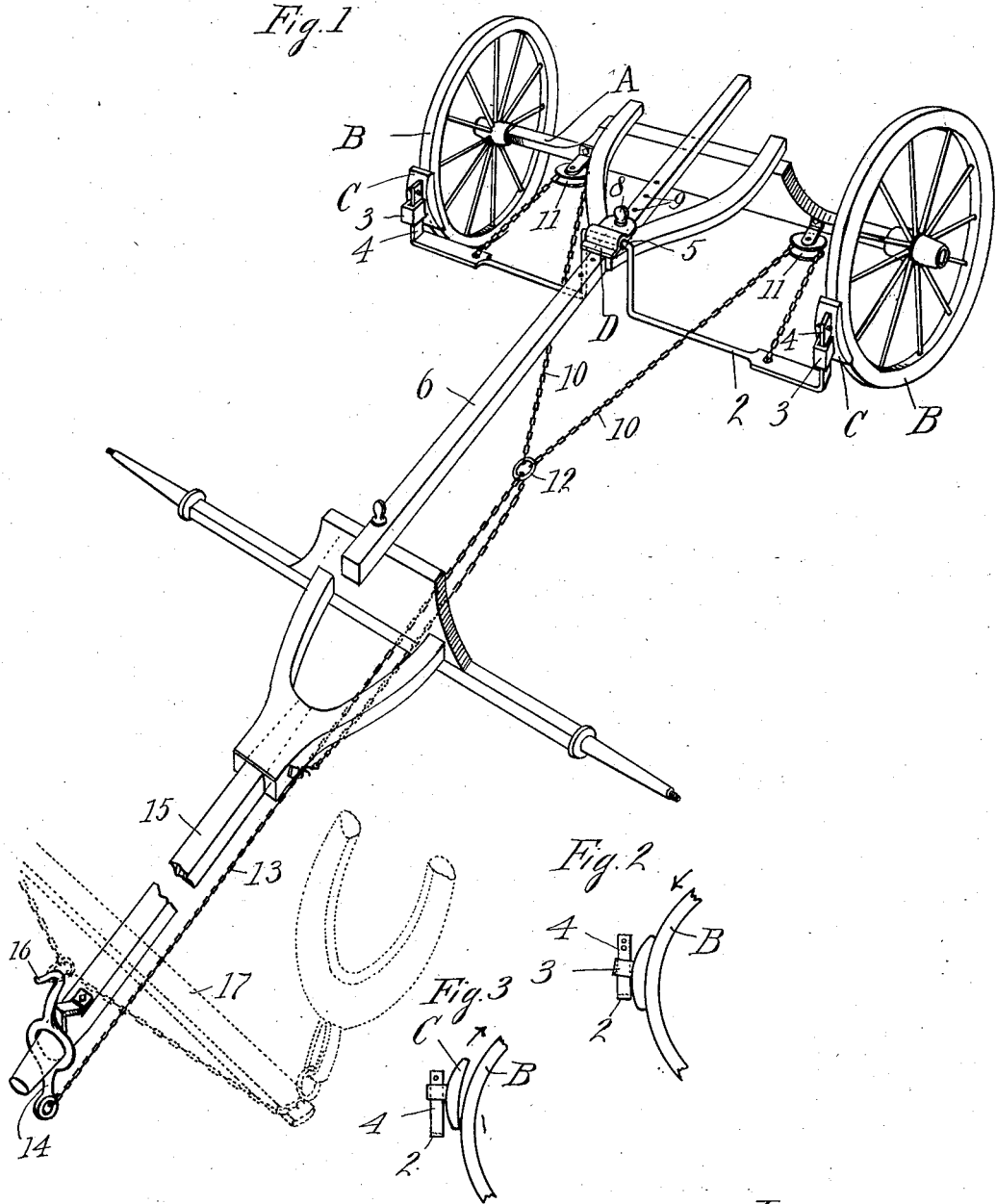
Witnesses,
George Voelker
H. Smith
Inventor,
Olof Peterson
by Lothrop & Johnson
his Attorneys.

UNITED STATES PATENT OFFICE.

OLOF PETERSON, OF ST. PAUL, MINNESOTA.

BRAKE.

1,021,474.     Specification of Letters Patent.     Patented Mar. 26, 1912.

Application filed January 12, 1910. Serial No. 537,696.

*To all whom it may concern:*

Be it known that I, OLOF PETERSON, a citizen of the United States, residing at St. Paul, in the county of Ramsey and State of Minnesota, have invented certain new and useful Improvements in Brakes, of which the following is a specification.

My invention relates to improvements in brakes, its object being to provide an improved construction of brake for the rear wheels of a wagon which will be automatically set when the horses pull back in going down hill and which will be loosened in the backing up of the wagon.

To this end my invention consists in the construction, combination and arrangement of parts hereinafter particularly described and claimed.

In the accompanying drawings forming part of this specification, Figure 1 is a perspective view of my invention; Fig. 2 is a detail view showing the brake in set position; and Fig. 3 is a detail view showing the brake in loosened position.

In the drawings A represents the rear axle and B the rear wheels.

C represents the brake shoes having vertically slidable supports upon the upwardly turned ends of the cross bar 2. As shown in the drawings the brake shoes are each formed with a rearwardly extending bracket 3 fitting over the corresponding upwardly turned end 4 of the cross bar. The cross bar 2 has journal support 5 in a bearing D adjustably supported upon the reach 6 by means of a pin 8 passing through said bearing and through one of the openings 9 in the reach. Cables 10 extend from the ends of the cross bar around idlers 11 to a ring 12 underneath the wagon. The ring 12 has cable connection 13 with a lever 14 pivoted upon the end of the tongue 15. The end of the cable passing through the ring is doubled so as to allow of its adjustment to lengthen or shorten the connection between the lever and brakes. The lever 14 is formed with an upwardly extending hook 16 to receive and centrally support the neck yoke 17. Thus in going down hill when the horses pull back, the neck yoke will pull rearwardly upon the upper ends of the lever 14 turning said lever upon its fulcrum, drawing the cables 10 and 13 forwardly to carry the brake shoes against the wheels. The forward rotation of the wheels will exert a downward pressure against the brake shoes causing a tight gripping between the brake shoes and rims of the wheels. In the backing up of the wagon the rearward rotation of the wheels will exert a forward pressure upon the brake shoes lifting them upon the ends 4 of the cross bar and releasing them from gripping position.

I claim as my invention:

In combination with a vehicle and its wheels, a cross bar having a longitudinally adjustable journal support upon said vehicle, brake shoes vertically slidable upon the ends of said cross bar in front of said wheels, a lever fulcrumed upon the free end of the vehicle tongue, and a cable connecting the lower end of said lever and said cross bar, said cable running over intermediate idlers, for the purpose set forth.

In testimony whereof I affix my signature in presence of two witnesses.

OLOF PETERSON.

Witnesses:
     F. W. SPRAGUE,
     CHAS. J. JOHNSON.

---

Copies of this patent may be obtained for five cents each, by addressing the "Commissioner of Patents, Washington, D. C."